Dec. 2, 1969  V. H. HASSELQUIST  3,481,811
METHOD OF MAKING LAMINATED BELTS
Original Filed Dec. 18, 1964  3 Sheets-Sheet 1
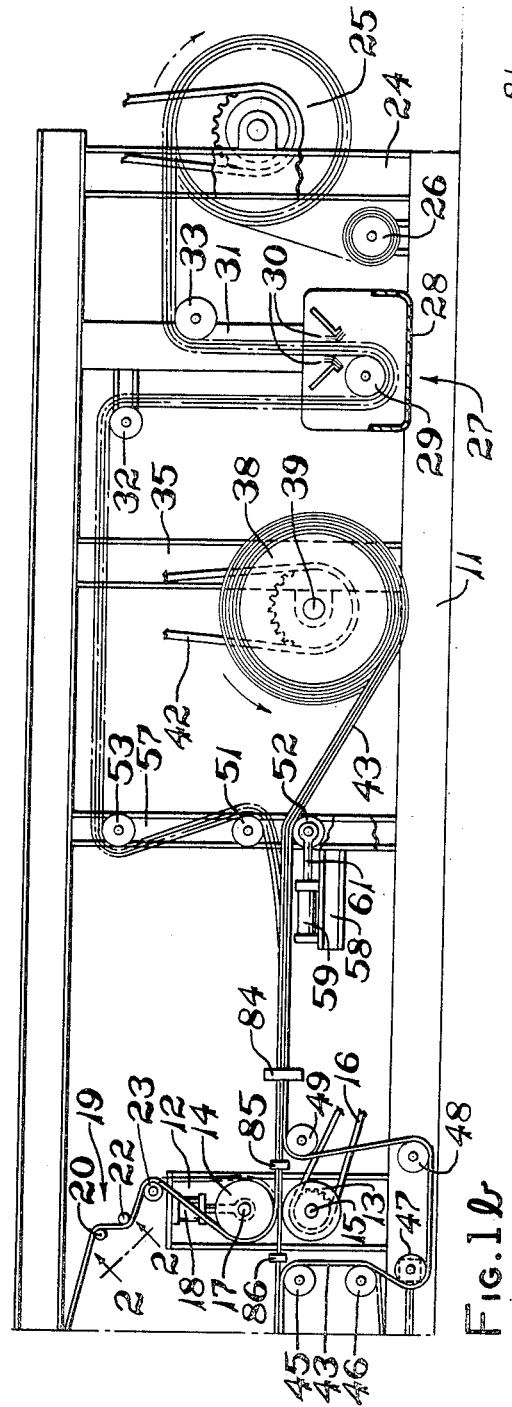
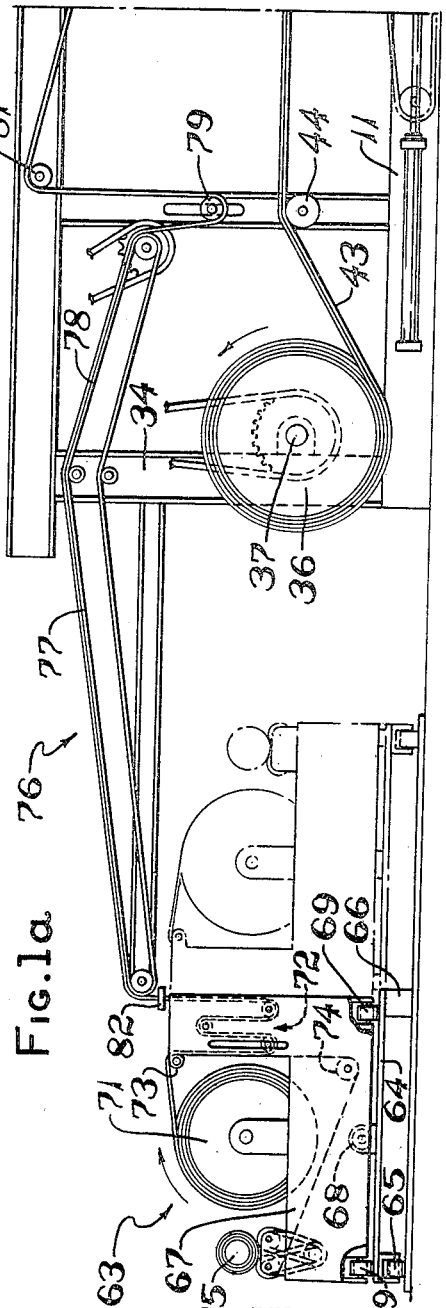
INVENTOR.
VICTOR H. HASSELQUIST
BY Joseph Januszkiewicz
ATTY.

Dec. 2, 1969     V. H. HASSELQUIST     3,481,811
METHOD OF MAKING LAMINATED BELTS
Original Filed Dec. 18, 1964     3 Sheets-Sheet 2

INVENTOR.
VICTOR H. HASSELQUIST
BY
*Joseph Januszkiewicz*
ATTY.

Dec. 2, 1969  V. H. HASSELQUIST  3,481,811
METHOD OF MAKING LAMINATED BELTS
Original Filed Dec. 18, 1964  3 Sheets-Sheet 3
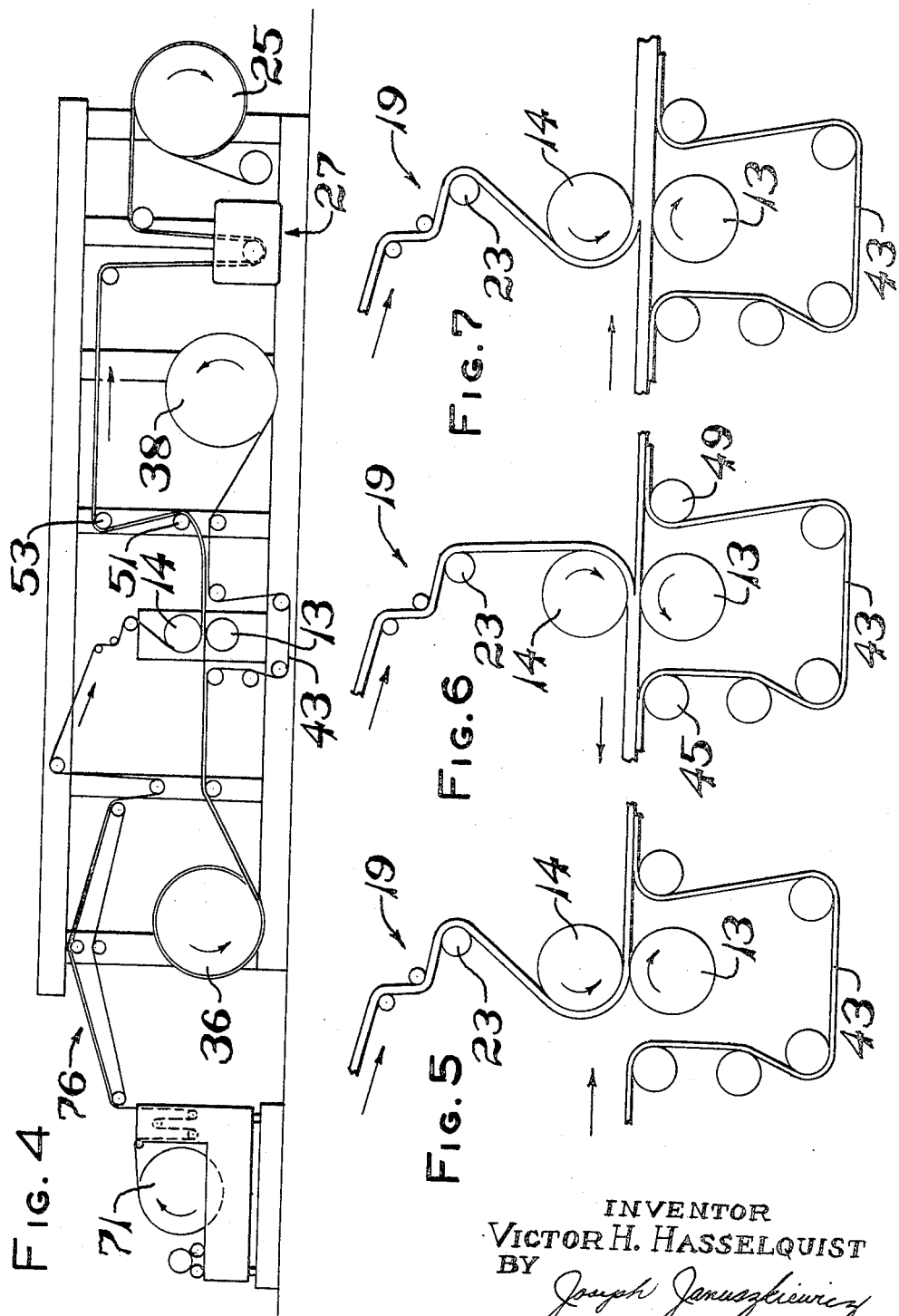
INVENTOR
VICTOR H. HASSELQUIST
BY
*Joseph Januszkiewicz*
ATTY.

United States Patent Office 3,481,811
Patented Dec. 2, 1969

3,481,811
METHOD OF MAKING LAMINATED BELTS
Victor H. Hasselquist, Akron, Ohio, assignor to The B. F. Goodrich Company, New York, N.Y., a corporation of New York
Original application Dec. 18, 1964, Ser. No. 419,434. Divided and this application May 16, 1968, Ser. No. 729,655
Int. Cl. B32b 31/04
U.S. Cl. 156—249         7 Claims

ABSTRACT OF THE DISCLOSURE

The method of making laminated belts wherein a captive liner shuttles back and forth between spaced storage rolls carrying the belt under construction therewith wherein the liner delivers the belt under construction for passage between laminating rolls which laminates additional ply or plies to the belt under construction for lamination thereto. Supply fabric for the belt under construction is fed continuously towards the laminating rolls and its direction of feed to the laminating rolls is changed in accordance to the direction in which the liner moves. The liner does not pass between the laminating rolls.

CROSS REFERENCE TO RELATED APPLICATIONS

This application is a division of U.S. patent application Ser. No. 419,434 filed Dec. 18, 1964, now Patent 3,397,104, dated Aug. 13, 1968.

This invention relates to conveyor belts and more particularly to the method of making a conveyor belt of multiple ply construction.

In the construction of long multi-ply conveyor belts it has been the general procedure to assemble individual plies manually on an assembly table wherein the plies being worked with are unwound from individual rolls, assembled by hand on the table and then the assembled plies are wound up in a liner on a take-up roll. The take-up roll is then transported back to the starting position and the assembled plies are unwound onto the assembly table where an additional ply is assembled thereon. The operation required shifting of the materials which was cumbersome in the case of long conveyor belts. The tension varied which introduced misalignment problems, wrinkling and in some cases the stretching of the material. The fabric used in such belts is heavy duck impregnated with rubber compounds to facilitate the adhesion of the plies. Frequently a very tacky gum is provided on only one surface and it is customary to wind such stock with the gum surface radially inwardly. Consequently, this will require special handling, transporting and rewinding of the fabric ply.

The present invention uses a method for building large conveyor belts which maintains alignment of the multiple plies while providing continuous uninterrupted assembling of the belt even though several plies are required in the belt construction thereby eliminating the transporting of the partially completed belt back and forth as in the prior constructions. In addition, the method permits fabric construction of a multiple ply belt more accurately and economically.

The method of the present invention simplifies the process of constructing a multiple layer belt such that the construction time is cut in half on those belts having several plies. The method comprises sequentially guiding individual plies to a carrier wherein such individual plies are laminated to the belt being carried by the carrier and thereafter winding the multiple ply belt onto a separate take-up spool.

An object of this invention is to provide a method which simplifies the construction of a multi-ply layer belt.

Another object of this invention is to provide a method which more efficiently constructs a multi-layer tension free belt that is durable.

Another object of this invention is to provide a method which constructs multiple ply belts of consistently high quality more efficiently and economically.

Another object of this invention is to provide a new and improved method of making a multi-layer belt.

Another object of this invention is to provide a method of manufacturing a long multi-ply layer belt by sequentially adding and laminating the layers to the belt being built with a minimum of handling.

These and other objects of the invention will become more apparent upon consideration of the following description in connection with the accompanying drawings, in which:

FIGS. 1a and 1b are schematic longitudinal views with portions broken away of the multi-ply belt-making apparatus which when longitudinally aligned show the entire apparatus of this invention.

FIG. 4 is a schematic view of the multi-ply belt-making apparatus with details omitted for clarity of parts, with rubberized fabric material shown as a line joining another ply also shown as a line.

FIG. 5 is a fragmentary schematic showing of a rubberized fabric material entering the laminating rolls for delivery to the captive liner.

FIG. 6 is a fragmentary schematic showing of a rubberized fabric material entering between the laminating rolls for lamination to a one-ply layer of rubberized fabric material to form a two-ply belt.

FIG. 7 is a fragmentary schematic showing of a rubberized fabric material entering the laminating rolls for lamination to two plies of rubberized material to form a three-ply belt.

Figure 2:
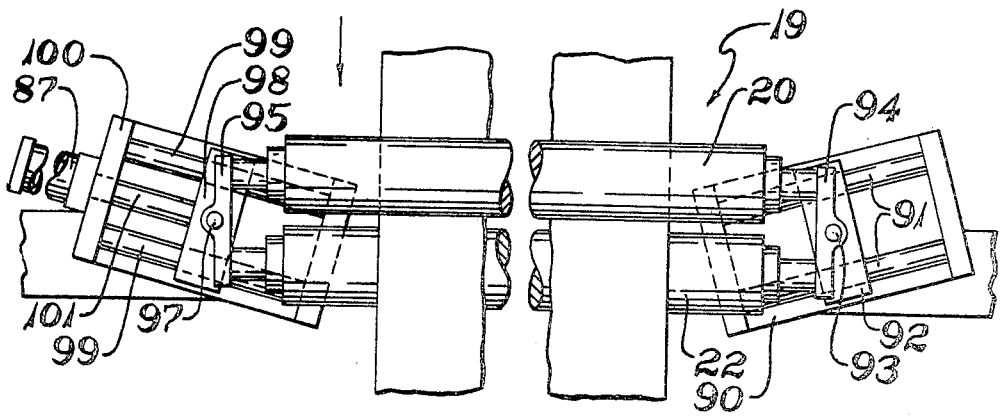
FIG. 2 is a plan view of the stock guide roll assembly taken along line 2—2 of FIG. 1b.

Referring now to the drawings, wherein like reference characters designate like or corresponding parts throughout the several views, there is shown in FIG. 1b a base frame 11 having at its intermediate portion a pair of spaced vertically extending support frames 12 which support for rotation a pair of laminating rolls 13 and 14. Roll 13 is rotatably mounted on a shaft 15 which is driven by a chain 16 from suitable drive means not shown. Laminating roll 14 is suitably mounted on a shaft 17 which has its respective end portions operatively connected to hydraulic cylinders 18 (only one shown in FIG. 1b) whereby pressurization of the head end of hydraulic cylinder 18 operates to move the roll 14 into contact with the roll 13 whereas pressurization of the rod end of hydraulic cylinder 18 operates to move the roll 14 in an upward direction away from roll 13 as viewed in FIG. 1b. The upper end portions of frames 12 support a stock guide roll assembly 19 (FIGS. 1a and 2) having rolls 20 and 22. A guide roll 23 is mounted on support frame 12 between the stock guide roll assembly 19 and the roll 14 to guide the stock or web of material from the roll 22 to the laminating roll 14.

The one end of base frame 11 has a pair of vertically extending support frame members 24 (FIG. 1b) on which is mounted a take-up reel 25, which reel 25 winds up the laminated conveyor belt at the completion of the operation. A liner reel 26 is mounted closely adjacent the take-up reel 25 and cooperates with such reel to provide liner material which is wound with the conveyor belt onto the take-up reel 25 in a manner well known in the art.

Mounted closely adjacent liner reel 26 on base frame 11 is a duster unit 27 which may be used to apply dust to a belt that is drawn therethrough prior to wind-up on take-up reel 25. Such duster unit 27 comprises a housing 28 which supports a horizontally disposed guide roll 29 and a pair of oppositely disposed brushes 30 which remove the excess dust as such belt is drawn upwardly past such brushes 30. A pair of laterally spaced supports 31 mounted closely adjacent the outer end portions of duster unit 27 and attached to the base frame 11 support a pair of guide rolls 32 and 33. Guide roll 32 directs the completed belt downwardly into the duster unit 27 for rolling contact with guide roll 29, which guide roll 29 directs such completed belt upwardly past brushes 30 to guide roll 33. Guide roll 33 then directs the completed belt onto the take-up reel 25. A pair of spaced frame members 34 (FIG. 1a) and 35 (FIG. 1b) are mounted respectively at the other end portion of base frame 11 and intermediate the vertical support frame 12 and support 31. Frame member 34 supports for rotation a carrier belt spool 36 mounted for rotation on a shaft 37 which is suitably driven and adapted to be braked in a manner well known in the art. Frame member 35 supports a carrier belt spool 38 that is mounted for rotation on a shaft 39 which is driven by a chain drive 42 and braked in a manner well known in the art.

Figure 3:
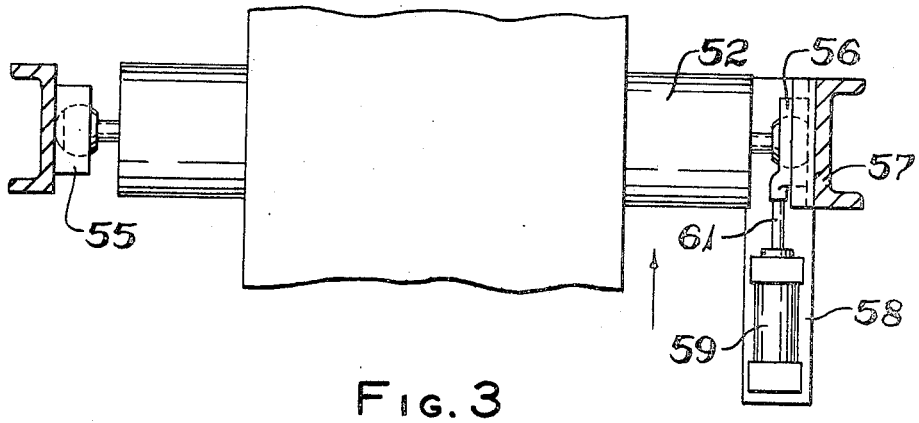
FIG. 3 is a plan view of the guide roll and its adjusting means for the captive liner.

Carrier belt spool 36 has wound thereon a captive liner 43 which is also wound onto carrier belt spool 38. Liner 43 from spool 36 is guided by guide roll 44 towards the laminating rolls 13 and 14. Closely adjacent the laminating rolls 13 and 14 a guide roll 45 directs such liner 43 downwardly around suitable guide rolls 46 and 47 to a guide roll 48 which in turn directs the liner 43 upwardly to a guide roll 49 adjacent laminating rolls 13, 14. Guide roll 49 guides the liner 43 towards a pair of guide rolls 51 and 52. Guide roll 52 guides the liner 43 onto spool 38 and during construction of a belt as to be described guides the liner 43 and a multi-ply belt under construction onto spool 38. Guide roll 51 guides the belt after construction upwardly towards a guide roll 53, which guide roll 53 directs such belt to the guide roll 32 whereas the guide roll 52 directs the liner 43 downwardly towards the spool 38, thereby separating the constructed belt from the liner 43. Guide roll 52 (FIGS. 1b and 3) is adjustable, thereby assuring the proper spooling and unwinding of the liner from the spool 38. The one end portion of guide roll 52 is mounted in a stationary pillow block 55 while the other end of guide roll 52 is mounted in an adjustable pillow block 56. A standard 57 supports a bracket 58 upon which is mounted a hydraulic cylinder 59. Hydraulic cylinder 59 has its piston rod 61 operatively connected to the pillow block 56, which pillow block 56 is suitably guided onto ways on the bracket 58. Adjustment of the guide roll 52 by the hydraulic cylinder 59 makes lateral corrections to the web and the fabric material that is passing over such guide roll 52 to assure proper winding of the liner 43 onto the spool 38.

Mounted for pivotal movement adjacent the other end of base frame 11 is a fabric supply unit 63. Supply unit 63 comprises a rectangular base frame 64 supported at one end by rollers 65 which are adapted to ride on suitable tracks, and pivotally mounted at the other end as at 66 to thereby facilitate the swing of the base frame 64 about pivot means 66. A carriage 67 adjustably mounted on base frame 64 for longitudinal movement is operatively connected to the piston rod of a hydraulic cylinder 68, which hydraulic cylinder 68 is secured to the base 64. To accommodate such longitudinal movement of the carriage 67 relative to the base frame 64, carriage 67 has rolls 69 secured thereon in rolling contact with suitable ways on the base frame 64. Carriage 67 supports for rotation thereon a fabric supply reel 71. Fabric supply reel 71 contains the rubberized fabric material wound in a cloth liner such that as reel 71 is rotated, the rubberized fabric material is separated from the liner by a dancer roll unit 72 as such rubberized fabric material passes over guide roll 73. In the dancer roll unit 72, one of the rollers is movable vertically along guides such that a sensor is operable to actuate a motor to drive the dancer unit 72 to maintain sufficient fabric material from the reel 71. The vertically driven roller is movable through suitable limits and its operation is well understood by those skilled in the art. The cloth liner travels over the guide roll 73 and passes underneath a guide roll 74 immediately below the guide roll 73, thence to a power driven take-up roll 75. The rubberized fabric material passes from the dancer unit 72 onto a conveyor belt unit 76 which has an upwardly extending conveyor run 77 followed by a downwardly extending conveying run 78. The rubberized fabric material passes from the front portion 78 onto a dancer unit 79 and thence via a guide roll 81 to the stock guide roll assembly 19 for passage to the laminating rolls 13 and 14.

Sensing means 82 (FIG. 1a) located above the dancer roll unit 72 and closely adjacent the forward end portion of the conveying unit 76 senses the position of the edge of the moving web of rubberized fabric material and operates to maintain the position of such moving web by repositioning the stock roll 71 via the carriage 67. Such sensing devices are well known in the art and, accordingly, a detailed description is not deemed necessary. The sensing means 82 actuates the hydraulic cylinder 68 to move the carriage 67 linearly relative to the base 64 to maintain alignment of the fabric material as it is conveyed onto conveying unit 76. A sensing means 84 operating on the edge of the web or liner 43 (sensor 84 is located between the laminating rolls and the hydraulic cylinder 59) maintains alignment of the liner 43 as it moves onto the spool 38. Reference is made to U.S. Patent 2,722,415 as one form of web guiding control. The sensing means 84 senses the edge of the liner 43 and actuates the hydraulic cylinder 59 (FIG. 3) whereby the guide roll 52 is moved in response thereto to maintain alignment of the edge of the material and the liner 43 as it moves onto the reel 38. The sensing means 84 may include a bleeder valve in a vacuum system wherein the edge of the material being guided passes over the center of a small hole in the face of an orifice when the material is traveling in the normally desired lateral position. As this material moves from this edge position it either moves onto or off of the hole in the orifice which thereby changes the vacuum in the system and actuates the hydraulic cylinder 59 to shift the guide roll 52 automatically in the proper direction to reposition the fabric material. Sensing means 85 and 86 located on the opposite sides of the pass line adjacent laminating rolls 13 and 14 operate to control a hydraulic cylinder 87 (FIG. 2) which adjusts guide rolls 20 and 22 to maintain alignment of the moving rubberized fabric material as it proceeds to the laminating rolls 13 and 14. Such action maintains the alignment of the rubberized fabric material as it passes onto the belt under construction on the pass line between laminating rolls 13 and 14.

Stock guide roll assembly 19 comprises a fixed support 90 which supports via a pair of ways 91 a movable carriage 92. Carriage 92 via pivot means 93 and bracket 94 supports one end of the pair of guide rolls 20 and 22. The other ends of guide rolls 20 and 22 are supported by a bracket 95 pivotally mounted as at 97 on a carriage 98. Carriage 98 is slidable on a pair of ways 99 which are mounted on a support 100. Hydraulic cylinder 87 is mounted on the support 100 and has its piston rod 101 operatively connected to the carriage 98 whereby selective pressurization of the hydraulic cylinder 87 adjusts carriage 98 linearly on the ways 99.

The various drives for the several reels are not shown since these would unnecessarily complicate the drawings and the descriptions and such drive means are conventional in the art.

In operation, it is to be assumed that the liner 43 is wound initially on the spool 36 and a rubberized fabric material is to be unwound from the fabric reel 71 as shown in FIG. 1a. The fabric reel 71 is rotated and the rubberized fabric material is unwound for separation from the liner such that the liner passes over the guide roll 74 for winding onto take-up roller 75 while the rubberized fabric material passes through the dancer roll unit 72 onto the conveyor belt unit 76 for passage to stock guide roll assembly 19 which delivers such rubberized fabric material between the laminating rolls 13, 14 as shown in FIG. 5. Liner 43 which passes from the spool 36 and over guide roll 44 is guided via guide rolls 45, 46, 47, 48 and 49, respectively, to bypass the laminating rolls 13 and 14 and thence via guide rolls 49 and 52 to the pass line of the laminating rolls 13 and 14 whereby the rubberized fabric material which passes between laminating rolls 13 and 14 is deposited onto such liner such that the fabric material and liner 43 are wound onto spool 38. Hydraulic cylinder 18 is pressurized to maintain pressure on the rubberized fabric material as it passes between such laminating rolls. During such operation, sensing means 84 operates on the hydraulic cylinder 59, while sensing means 85 operates on the stock guide roll assembly 19, while sensing means 82 operates on the hydraulic cylinder 68 to thereby maintain alignment between the rubberized fabric material and the liner 43 to assure proper edge alignment. Assuming that the proper length of rubberized fabric material has been wound onto the liner 43, the operation of feeding rubberized fabric material and liner 43 is stopped. The rubberized fabric material which has not been joined to the liner 43 is cut closely adjacent the laminating rolls 13 and 14 between rolls 23 and 14. The rubberized fabric material is now fed from the guide roll 23 downwardly and to the right side of laminating roll 14, and thereafter enters between laminating rolls 13 and 14 in a direction from right to left as viewed in FIG. 1b and as shown in FIG. 6.

Reel 71 is again rotated to feed the rubberized fabric material to the laminating rolls 13 and 14 whereby the rubberized fabric material is directed in a direction from left to right as viewed in FIG. 1a. Simultaneously with such action reels 36 and 38 are rotated in a direction to feed the liner 43 from right to left as viewed in FIG. 1b and as shown in FIG. 6. The rubberized fabric material which has been deposited on the liner 43 passes between laminating rolls 13 and 14 such that the fabric material delivered by the guide roll 23 is laminated onto such material passing from the liner 43. Such operation fabricates a two-ply belt in order to construct a belt of several plies. The above operation is reversed wherein the rubberized fabric material is cut closely adjacent the laminating rolls 13 and 14 between rolls 23 and 14. The rubberized fabric material is then fed from the guide roll 23 downwardly and to the left of laminating roll 14 as viewed in FIGS. 4 and 7, and thereafter enters between laminating rolls 13 and 14 in a direction from left to right as seen in FIG. 7. Thus, as two plies are fed from left to right, the third ply is fed from above and is laminated to the two plies to make a three-ply laminated belt. As depicted in FIG. 4, the belt under construction is fed from reel 36 to pass between laminating rolls 13 and 14 while a ply of rubberized fabric material is fed between laminating rolls 13 and 14 from supply reel 71 for lamination thereto after which such laminated belt passes under guide roll 51 for wind-up onto take-up reel 25. If an additional ply is to be built into the belt, the above operation is continued, as an additional ply stock of rubberized fabric material is assembled onto the existing belt under construction on the liner 43, as such belt under construction passes between the laminating rolls 13 and 14 as shown in FIG. 7 to thereby construct a three-ply belt. The operations explained above are repeated until the requisite number of plies are assembled. After the last ply has been laminated, the completed belt is separated from the liner 43 by passing the constructed belt over guide roll 53 towards the guide roll 52 whereas the liner 43 passes over guide roll 52 and is wound onto the reel 38. The constructed belt then passes through the duster unit 27 and over the guide roll 33 onto take-up reel 25 as shown in FIG. 4.

In those circumstances where a very tacky gum is provided on one surface, provision is made so that this tacky surface meets the belt being constructed so that the tacky surface adheres to the belt. In this situation, the base frame 64 is pivoted about the pivot means 66 and swung into the position shown in phantom lines in FIG. 1a such that the tacky surface will be conveyed so that it will meet the belt under construction with its tacky surface in abutting contact thereto for lamination by the rolls 13 and 14 onto the belt under construction. Means may be provided to rotate or pivot base frame 64 about the pivot means 66.

Although the drawings contain only one fabric supply means, other fabric supply means may be provided duplicating the fabric supply unit 63, the conveyor belt unit 76 and the laminating rolls 13 and 14 such that the additional fabric supply unit will supply fabric to an additional set of laminating rolls, which additional laminating rolls would be located between the laminating rolls 13, 14 and the standard 57 (which standard 57 supports the guide roll 52 for the belt under construction), thus providing plural laminating means. In this situation, two plies may be laminated to an existing belt under construction simultaneously, thereby reducing the time necessary to construct a belt.

It should be understood, of course, that the foregoing disclosure relates to only preferred embodiments of the invention and that numerous modifications or alterations may be made thereon without departing from the spirit and scope of the invention.

What is claimed is:

1. The method of forming a laminated conveying belt which consists in guiding a first ply of belt material onto a captive moving liner, conveying a second ply of belt material toward said liner and first ply, separating said first ply of belt material from said liner while laminating under pressure said second ply of belt material onto such first ply of belt, and guiding such pressurized laminated formed belt onto such moving liner.

2. The method of forming a laminated belt as set forth in claim 1 wherein such laminated formed belt is unwound from such liner onto a separate spool while passing such liner onto another spool.

3. The method of forming a laminated conveyor belt which consists in guiding an elongated liner selectively between stations, guiding a first ply of belt material to such liner in its passage between such stations to form a roll of belt wound into such liner, adding and laminating sequentially individual plies of belt to such belt as such belt and liner are unwound from one of such stations and wound to the other of such stations, and thereafter separating such laminated plies of material from such liner.

4. The method of forming a laminated conveyor belt which consists in guiding an elongated liner between stations, spooling a first ply of belt material onto such liner as such liner is spooled into one of such stations, spooling a second ply of belt material onto such first ply as such first ply and liner are transferred from one of such stations to the other, laminating the union of such plies as such transfer is being effected while simultaneously guiding said liner for by-passing the lamination followed by pickup of said laminated plies after lamination, thereafter unwinding such laminated plies from such liner, and dusting such laminated plies as winding such completed belt onto a take-up reel.

5. The method of forming a laminated belt comprising the steps of operating a captive liner between spaced stations, supplying plural belt material webs to such a moving liner at spaced points, laminating said material webs together, delivering such laminated webs to such liner, supplying additional plural belt material webs to such laminated web at spaced points, laminating such plural webs to such laminated web at said spaced points, delivering such laminated webs to such liner for conveyance thereby, and thereafter separating such laminated web from such liner for winding a completed belt onto a take-up reel.

6. The method of laminating a belt composed of multiply layers of belt material comprising the steps of shuttling a captive liner between spaced stations along a longitudinal pass line that extends between a pair of laminating rolls, guiding said liner for by-passing said laminating rolls but for movement on either side of said laminating rolls on said pass line, passing ply material for passage onto said liner and for passage through said laminating rolls along said pass line, conveying other ply material onto said liner, and laminating said composite ply materials together as they pass through said laminating rolls while said liner by-passes said laminating rolls.

7. The method of laminating a belt composed of multiply layers of belt material comprising the steps of selectively winding and unwinding a liner between spaced spools along a pass line that extends through laminating means; feeding belt material toward and onto said pass line; separating said liner and said belt material, and laminating said belt material; depositing said laminated belt onto said liner; feeding additional belt material toward and onto said pass line; separating said liner and belt material, and laminating said belt material together; and depositing said laminated belt material onto said liner for subsequent pickup and storage.

References Cited

UNITED STATES PATENTS 3,021,250 2/1962 La Voie _____ 156—324
3,038,833 6/1962 Glover _____ 156—324

REUBEN EPSTEIN, Primary Examiner

U.S. Cl. X.R.

156—184, 193, 324